Sept. 12, 1950   M. R. SHAW ET AL   2,522,198
SANITARY POULTRY FOUNTAIN
Filed June 20, 1949   2 Sheets-Sheet 1
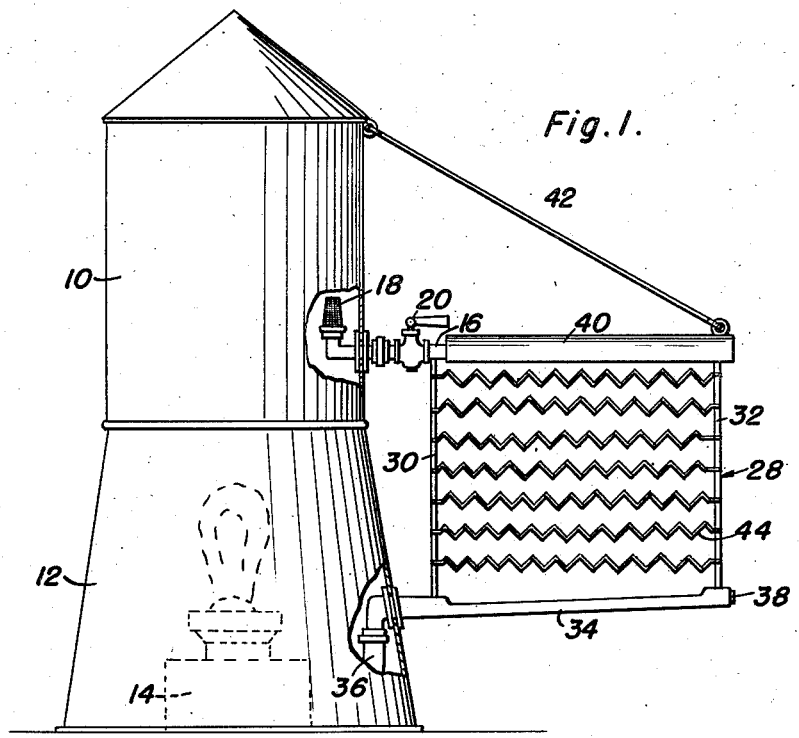
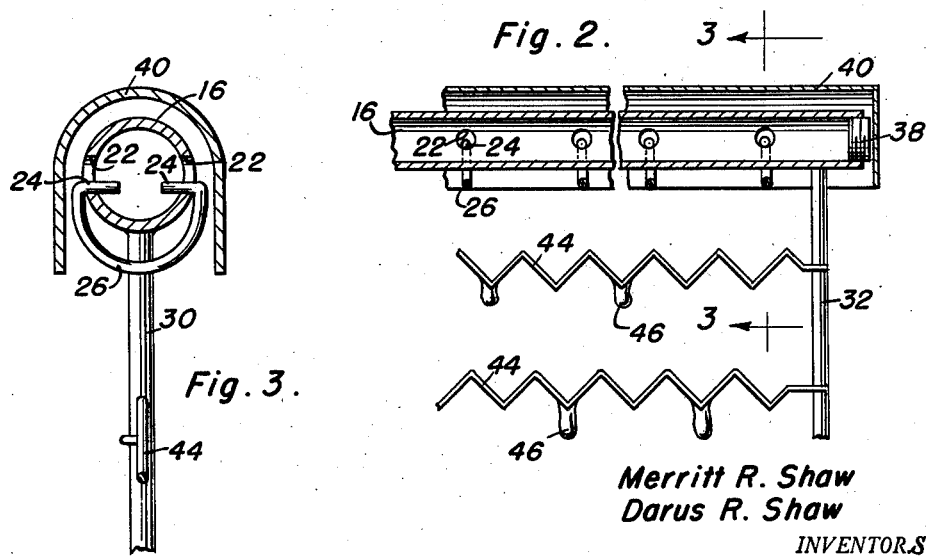
Merritt R. Shaw
Darus R. Shaw
INVENTORS Sept. 12, 1950 M. R. SHAW ET AL 2,522,198
SANITARY POULTRY FOUNTAIN
Filed June 20, 1949 2 Sheets-Sheet 2
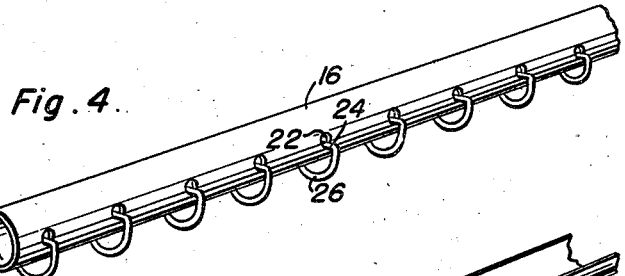
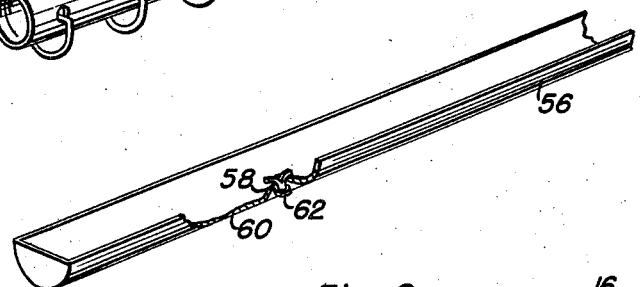
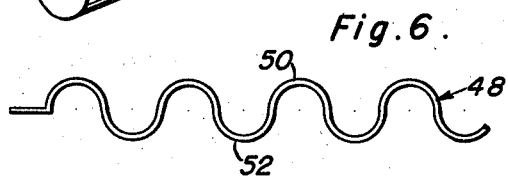
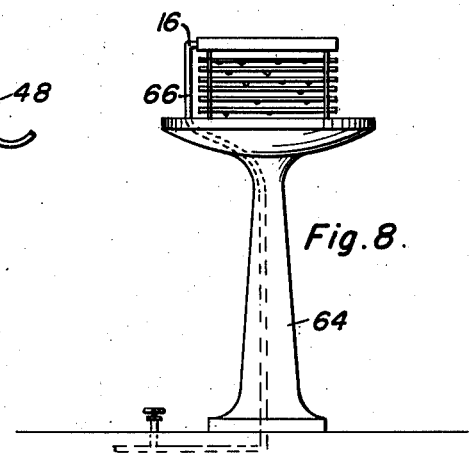
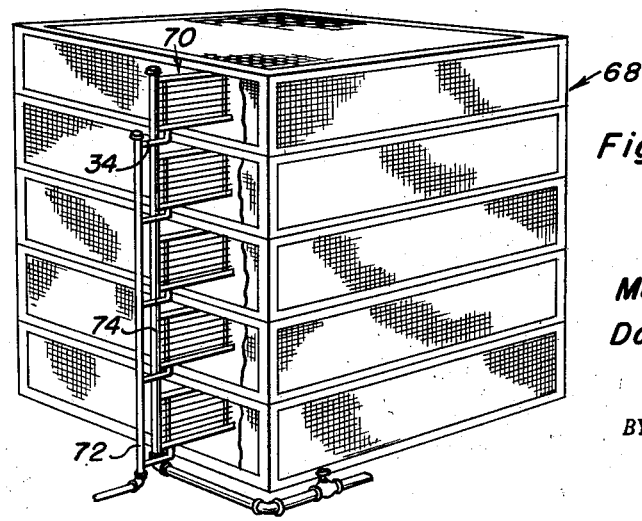
Merritt R. Shaw
Darus R. Shaw
INVENTORS Patented Sept. 12, 1950

2,522,198

UNITED STATES PATENT OFFICE 2,522,198

SANITARY POULTRY FOUNTAIN

Merritt R. Shaw and Darus R. Shaw,
East Jordan, Mich.

Application June 20, 1949, Serial No. 100,104

6 Claims. (Cl. 119—72.5)

This invention relates to new and useful improvements in sanitary poultry fountains and the primary object of the present invention is to provide a more efficient and effective poultry drinking fountain than that disclosed in our patent numbered 2,193,258, filed November 29, 1935, and issued March 12, 1940.

Another very important object of the present invention is to provide a sanitary drinking fountain for poultry and the like embodying a novel and improved means for delivering the water downwardly along a grid member or frame, in drops, so that poultry can pick up the drops of water in a convenient manner.

A further object of the present invention is to provide a sanitary poultry fountain that is extremely small and compact in structure and which is quickly and readily assembled or disassembled in a convenient manner.

A still further aim of the present invention is to provide a sanitary poultry fountain that is simple and practical in construction, strong and reliable in use, efficient and durable in operation, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a supply tank and showing the present invention applied thereto, and with parts of the tank broken away;

Figure 2 is an enlarged fragmentary vertical sectional view through portions of the frame;

Figure 3 is an enlarged vertical sectional view taken substantially on the plane of section line 3—3 of Figure 2;

Figure 4 is a perspective view of one of the dispensers used in conjunction with the present invention;

Figure 5 is a perspective view of another type of dispenser for use with the present invention;

Figure 6 is a fragmentary side elevational view of one of the liquid retaining members used in conjunction with the present invention;

Figure 7 is a fragmentary side elevational view of another of the liquid retaining members adapted to be used with the present invention;

Figure 8 is an elevational view showing the present invention applied to a poultry or bird bath; and Figure 9 is a perspective view showing the present invention installed in a poultry house or battery brooder.

Referring now to the drawings in detail, wherein for the purpose of illustration, there is disclosed a preferred embodiment of the present invention, the numeral 10 represents a supply tank which is supported on a hollow base 12 into which may be placed a lamp 14, as shown in dotted line in Figure 1, for heating the fluid medium, such as water, in the tank during cold weather.

A horizontally arranged supply pipe or conduit 16 has one end entering the tank 10 and this end is provided with a screen 18 for screening the water passing from the tank into the pipe 16 and the flow of water to the pipe 16 is controlled by a manually operated valve 20.

The supply pipe is provided with diametrically opposed pairs of longitudinally spaced delivery openings or apertures 22 that loosely receive the inturned end portions 24 of a plurality of U-shaped liquid dispensing members or elements 26. As liquid passes outwardly of the supply pipe 16 through the openings 22 the liquid will roll along the legs of the U-shaped members 26 to form drops of liquid on the web portions on the U-shaped member that are spaced beneath the lower periphery of the pipe 16.

A grid member, designated generally by the numeral 28, is supported by the supply pipe 16 and includes a pair of spaced parallel rods 30 and 32 having their upper ends suitably fixed to the supply pipe 16. The lower ends of the rods 30 and 32 are secured to a drain trough 34 having one end leading to a drain conduit 36 mounted in the base 12. The trough 34 inclines downwardly toward the base 12 so that a liquid entering the trough will gravitate into the drain conduit 36.

The outer ends of the pipe 16 and the trough 34 are closed by plugs 38 which facilitate cleaning of the parts and a substantially U-shaped hood 40 embraces or covers the pipe with the web of the hood 40 spaced above the pipe 16. A brace and support rod 42 has one end connected with the top of the tank and the other end to the hood.

A plurality of spaced parallel rows of horizontally disposed, undulated liquid retaining members 44 are terminally fixed to the rods 30 and 32. The members 44 are disposed directly beneath the pipe 16. The high and low points of the members 44 are substantially pointed as shown best in Figure 2 of the drawings, with the high points of adjacent members 44 staggered with respect to each other.

As the liquid, or drops of liquid, fall from the members 26 the said liquid will collect on the members 44 and form drops, such as 46, on the low points of the members 44.

Figure 6 illustrates the liquid retainer in slightly modified form. In this embodiment, the liquid retaining member 48, adapted to replace the members 44, is provided with rounded alternate high and lower points 50 and 52.

As shown in Figure 7, the liquid retaining member consists of a twisted strap 54.

Reference is now directed to Figure 5 wherein there is disclosed the liquid dispenser in slightly modified form. In this embodiment, the liquid retaining and dispensing member 56 consists of a trough having a plurality of longitudinally spaced delivery openings 58 in its lower wall 60.

The shanks of rivets 62 are loosely received in the openings 58 and the shanks of the rivets are split and turned outwardly so that liquid passing through the openings 58 will roll down the shanks of the rivets to form drops on the heads of the rivets.

Figure 8 shows the present invention supported upon a bird bath 64 with the supply pipe 16 connected to a supply conduit 66 extending through the bird bath and to a suitable source of supply.

A poultry house or battery brooder 68 is shown in Figure 9 and consists of a group of compartments in which there is mounted the present fountain unit 70. The drain troughs 34 of each unit are connected to a common drain pipe 72 and the supply pipe of each unit is supplied by a common delivery pipe 74.

In view of the foregoing description taken in conjunction with the accompany drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A drinking fountain for poultry and the like comprising a tubular and horizontal supply pipe having a plurality of longitudinally spaced transverse openings in diametrically opposite sides thereof, and means carried by the supply pipe for causing water leaving the supply pipe through said openings to form drops beneath the supply pipe, said means comprising a plurality of U-shaped members embracing the lower surface of the pipe and having inwardly turned end portions loosely received in said openings, said members hanging vertically beneath said supply pipe.

2. The combination of claim 1 and a hood embracing and shielding said supply pipe and said U-shaped members.

3. The combination of claim 1 and a vertical row of liquid retaining members located under the supply pipe.

4. A drinking fountain for poultry and the like comprising a tubular and horizontal supply conduit closed at one end and having a plurality of longitudinally spaced transverse openings in each side thereof, the openings in one side of said conduit being in registry with the openings in the other side of said conduit, a substantially U-shaped hood having a web portion spaced above the supply conduit and leg portions spaced from the sides of said supply conduit, a group of U-shaped elements having inturned end portions received in said openings and adapted to receive water leaving the openings in the supply conduit to form drops beneath the supply conduit, said elements embracing the conduit and hanging vertically from the conduit and means mounted beneath the conduit to form further drops as the drops on said elements fall downwardly thereupon.

5. A drinking fountain for poultry and the like comprising a tubular supply conduit closed at one end and having a plurality of longitudinally spaced transverse openings in each side thereof, the openings in one side of said conduit being in registry with the openings in the other side of said conduit, a substantially U-shaped hood having a web portion spaced above the supply conduit and leg portions spaced from the sides of said supply conduit, a group of U-shaped elements embracing the conduit and having inturned end portions received in said openings and supported vertically beneath the supply conduit, said elements adapted to receive water leaving the openings in the supply conduit to form drops beneath the supply conduit, and a vertical row of liquid receiving members mounted beneath said conduit to form drops as the drops on said elements fall downwardly.

6. The combination of claim 4 wherein said means includes a plurality of horizontally extending vertically spaced, undulated wire members.

MERRITT R. SHAW.
DARUS R. SHAW.

REFERENCES CITED

The following references are of record in the file of this patent:

UNITED STATES PATENTS

| Number | Name | Date |
|---|---|---|
| 890,044 | Godbey | June 9, 1908 |
| 1,051,846 | Brown | Jan. 28, 1913 |
| 2,193,258 | Shaw et al. | Mar. 12, 1940 |